Patented Nov. 10, 1953

2,658,882

UNITED STATES PATENT OFFICE 2,658,882

STABILIZATION OF SILICONE RUBBER

Remo R. Maneri, Midland, Mich., assignor to Dow Corning Corporation, Midland, Mich., a corporation of Michigan No Drawing. Application October 3, 1952, Serial No. 313,057

13 Claims. (Cl. 260—37)

This invention relates to an organopolysiloxane elastomer having exceptional stability at elevated temperatures.

The silicone rubber in accordance with this invention consists of heat curable mixtures comprising (a) 100 parts of an organopolysiloxane having the general formula

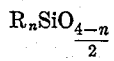

where R is a methyl or phenyl radical, at least 50 per cent of the total number of R radicals being methyl, and n has an average value of 1.95 to 2.05; (b) a silica filler; (c) a vulcanizing agent; (d) at least 0.5 pt. of a zirconium compound of the group metallic zirconate salts, zirconium silicates, or metallic fluorozirconates.

Silicone rubbers have long been recommended as being useful for continuous service at 150° C. At temperatures higher than this, although showing great superiority to other elastomeric materials, silicon rubbers deteriorate at an increasing rate as the service temperature is increased. This deterioration becomes evident by increase in durometer and decrease in tensile strength and elongation. In the past silicon rubbers have been recommended, therefore, for only limited exposure to temperatures of 250° C. or above.

It is the object of this invention to prepare siloxane rubbers or elastomers which upon being vulcanized and cured are more capable of resisting deterioration of physical properties when subjected to temperatures of 150–250° C. These stability advantages may be obtained with silica filled silicone rubbers simply by admixing certain zirconium compounds with the unvulcanized silicone rubber compositions.

The compositions of this invention are prepared by compounding (a) a polysiloxane (b) a silica filler, (c) a vulcanizing agent, and (d) a zirconium compound in any desired manner.

The polysiloxanes which are utilized in the composition of this invention are those having the general formula

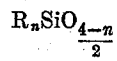

where n has an average value of 1.95 to 2.05 and R is a methyl or phenyl radical. In these siloxanes at least 50 per cent of the total hydrocarbon radicals are methyl radicals. Thus, homopolymers of dimethylsiloxane or copolymers of dimethylsiloxane with methylphenylsiloxane or diphenylsiloxane, etc. may be employed herein.

In addition, minor amounts of monohydrocarbon substituted siloxane units or trihydrocarbon substituted siloxane units, such as $C_6H_5SiO_{3/2}$, and $(CH_3)_3SiO_{1/2}$ may be employed in conjunction with the dihydrocarbon substituted siloxanes as long as the value of $n$ remains in the above range. The siloxane polymers are characterized by being benzene soluble and range from fluids having viscosities of at least 15,000 centistokes to deformable solids. Preferred are the solid siloxane polymers or copolymers having viscosities on the order of a million centistokes or more. These polymers are well known.

Methods for preparing the siloxane polymers are also well known and adequately described in the patent literature. The fillers employed in this invention are finely divided silica fillers such as diatomaceous earth, silica aerogels, fumed silicas and xerogels.

The preferred fillers are the so-called "reinforcing" silica fillers which are made up of finely divided $SiO_2$ particles having a pore volume of at least 3 ccs. per gram and a heat of wetting in hexamethyldisiloxane of from 0.1 to 1.8 calories per cc. of pore volume. The pore volume may be readily determined by placing a weighed sample of the silica in a picnometer, filling the picnometer with water and determining the ccs. of water present by difference in weight. The picnometer is then recharged with another weighted sample of the silica and the picnometer is filled with mercury. After the volume of mercury in ccs. is determined it is subtracted from the volume of water in ccs. to give the pore volume in ccs. This may be converted to ccs. of pore volume per gram based upon the weight of the sample employed.

The heat of wetting is determined by placing a weighed sample of hexamethyldisiloxane in a calorimeter. A weighed sample of the silica having the same temperature as the disiloxane in the calorimeter is then added to the disiloxane and the heat of wetting is determined from the temperature rise by means of the following formula:

$$H_w = \frac{\Delta T}{W_s}(H + H_1 \times W_1 + 0.188 W_s)$$

where $H_w$ is the heat of wetting in calories per gram, $\Delta T$ is the temperature rise in degrees centigrade, $W_s$ is the weight of the silica, H is the calorimeter constant, $H_1$ is the specific heat of the hexamethyldisiloxane and $W_1$ is the weight of the hexamethyldisiloxane. The constant 0.188 is the specific heat of quartz. The so determined heat of wetting is in calories per gram. This value may be converted to calories per cc. of pore volume simply by dividing by the pore volume in ccs. per gram.

Fumed silicas and silica aerogels are examples of commercial silica which meet the above specifications of pore volume and heat of wetting. The silica fillers may, if desired, be modified by treatment, for example, with organosilanes such as the methylchlorosilanes prior to their incorporation in the siloxane rubber.

Maximum tensile-elongation properties are obtained employing reinforcing silicas in amount of 20 to 80 parts by weight based on the siloxane (100 parts).

The amount of silica filler employed herein has no effect upon the stabilizing action of the zirconium compounds. Other fillers in addition to $SiO_2$ such as the metallic oxides may be employed in minor proportions without substantially affected the physical properties of the composition. Thus, minor amounts of ZnO, $TiO_2$, and $Fe_2O_3$ may be used to pigment or color the composition. The stabilizing effect of the zirconium compounds is not appreciable when metal oxide fillers alone are employed in siloxane rubbers.

Effective silicone rubber vulcanizing agents are well known in the art of which the acyl peroxides, benzoyl peroxide and tertiary butyl perbenzoate, are probably the most often used. Any acyl peroxide, of course, containing at least one aromatic acyl radical, for example benzoyl acetyl peroxide, dinaphthyl peroxide, benzoyl lauroyl peroxide, and halogenated or nitrated benzoyl peroxides may be employed as vulcanizing agent. Generally effective vulcanization and curing are obtained employing 1 to 10 pts. by weight vulcanizing agent based on 100 pts. (by weight) of polymer.

The zirconium compounds operative in this invention are metal zirconates, e. g, the metal salts of zirconic acid, $H_2ZrO_3$ (known as metallic zirconate salts), such as barium zirconate, calcium zirconate, strontium zirconate, and magnesium zirconate; zirconium silicates such as zirconium silicate, zinc zirconium silicate, barium zirconium silicate, calcium zirconium silicate, and magnesium zirconium silicate; and metal salts of fluorozirconic acid ($H_2ZrF_6$) such as sodium fluorozirconate, calcium fluorozirconate and potassium fluorozirconate. The above compounds are preferred since they are available commercially. Other compounds which may be employed are cadmium zirconate, lithium fluorozirconate and cesium fluorozirconate. It is to be understood, of course, that any metallic zirconates, metallic fluorozirconates and zirconium silicates, in addition to those specifically mentioned, are within the scope of this invention. The advantages of this invention are not obtained by employing some zirconium compounds such as the zirconyl nitrates.

The zirconium compounds should be employed in amounts of at least 0.5 part by weight based on 100 parts of siloxane. Generally preferred are amounts ranging from 1 to 20 parts by weight. No advantage is gained by employing greater than 40 parts of the zirconium compound per 100 parts of siloxane.

The manner of compounding the composition of this invention is well known to the art using ordinary equipment such as mixing rolls and dough mixers. The order of addition of fillers, vulcanization agent and additives such as the above mentioned zirconium compounds to the polymer is not critical.

This invention is illustrated by the following examples. It is to be understood, however, that the invention is not limited in any manner except as defined in the claims.

EXAMPLE I

A siloxane rubber consisting of 100 parts of a benzene soluble solid dimethylpolysiloxane, 35 parts of a silica filler having a heat of wetting of 1.47 cal. per cc. of pore volume, and a pore volume of 4.04 ccs. per gram, and 1½ parts of benzoyl peroxide was compounded on rubber mixing rolls. To separate portions of this rubber were admixed 3 parts (based on the siloxane) of the zirconium substances listed below in Table 1. The rubber samples containing the various zirconium additives were each molded under pressure at 150° C. for 5 minutes. The so molded test sheets of vulcanized rubber were then placed in a 250° C. oven. Samples were removed from the oven for measurement of physical properties after 1 and 7 day intervals as shown in Table 1. The hardness (Durometer Shore A), tensile in pounds per square inch, and per cent elongation at break were determined in accordance with ASTM tests D676–49T and D412–49T. These values are designated D, T, and E respectively in the table. One day (24 hours) at 250° C. is a common oven cure administered to high stress-strain rubbers to obtain the best balance of physical properties. Hence, Table 1 represents the effect of heat ageing cured silicone rubbers for 6 days at 250° C.

Table 1

| Additive | Ageing at 250° C. | | | | | |
| --- | --- | --- | --- | --- | --- | --- |
| | 1 day | | | 7 days | | |
| | D | T | E | D | T | E |
|  | 49 | 860 | 347 | 73 | 405 | 23 |
| Barium Zirconate | 45 | 852 | 360 | 57 | 722 | 197 |
| Calcium Zirconate | 52 | 739 | 357 | 57 | 605 | 180 |
| Strontium Zirconate | 47 | 885 | 375 | 57 | 635 | 180 |
| Magnesium Zirconate | 50 | 797 | 375 | 58 | 665 | 210 |
| Magnesium Zirconium Silicate | 49 | 850 | 330 | 55 | 635 | 210 |
| Zirconium Silicate | 49 | 759 | 275 | 63 | 752 | 143 |
| Sodium Fluorozirconate | 48 | 483 | 385 | 63 | 738 | 245 |
| Calcium Fluorozirconate |  |  |  | 63 | 607 | 183 |
| Potassium Fluorozirconate |  |  |  | 60 | 772 | 257 |

The superior heat stability of the rubbers containing the zirconium additives is very evident after 6 days at 250° C. as shown by comparison with the blank.

EXAMPLE II

To separate portions of the silicone rubber of Example I were added varying amounts of barium zirconate as indicated in column 1 of Table 1. Column 1 records the parts by weight barium zirconate. The resulting mixtures were cured in the same manner as in Example I with the following results:

Table 2

| Parts, Barium Zirconate | Ageing at 250° C. | | | | | |
| --- | --- | --- | --- | --- | --- | --- |
| | 1 day | | | 7 days | | |
| | D | T | E | D | T | E |
| 0 | 49 | 878 | 335 | 89 | 498 | 10 |
| 1 | 49 | 678 | 297 | 66 | 723 | 100 |
| 12 | 49 | 625 | 305 | 58 | 586 | 163 |
| 20 | 48 | 683 | 340 | 56 | 570 | 180 |
| 40 | 53 | 587 | 283 | 58 | 590 | 155 |

The silicone rubbers of this invention are much more suitable for employment at 200° to 300° C. than silicone rubbers previously known. The increase in heat stability occasioned by this invention is accomplished without any sacrifice of any desirable physical or electrical property.

EXAMPLE III

When a solid benzene soluble polymer consisting of 5 mol per cent phenylmethylsiloxane or 5 mol per cent diphenylsiloxane and 95 mol per cent dimethylsiloxane is employed as in Example I in silicone rubbers containing the zirconium additives of Example I, heat stable compositions are obtained.

That which is claimed is:

1. As a composition of matter a heat convertible mixture comprising (a) 100 parts by weight of an organopolysiloxane having the general formula $$R_nSiO_{\frac{4-n}{2}}$$

where R is a monovalent hydrocarbon radical selected from the group consisting of methyl and phenyl radicals, n has an average value of 1.95 to 2.05, inclusive, and in said siloxane at least 50 per cent of the total number of hydrocarbon radicals being methyl radicals, (b) a silica filler, (c) vulcanizing agent, and (d) at least 0.5 part by weight of a zirconium compound selected from the group consisting of metallic zirconate salts, zirconium silicates, and metal fluorozirconates.

2. The composition of claim 1 wherein the zirconium compound is a metallic zirconate salt.

3. The composition of claim 1 wherein the zirconium compound is a metal fluorozirconate.

4. The composition of claim 1 wherein the zirconium compound is a zirconium silicate.

5. As a composition of matter a heat convertible mixture comprising (a) 100 parts by weight organopolysiloxane having the general formula $$R_nSiO_{\frac{4-n}{2}}$$

where R is a monovalent hydrocarbon radical selected from the group consisting of methyl and phenyl radicals, and n has an average value of 1.95 to 2.05 and in said siloxane at least 50 per cent of the total number of hydrocarbon radicals being methyl radicals, (b) a silica filler, (c) an organic peroxide vulcanizing agent, and (d) at least 0.5 part by weight of a zirconium compound selected from the group consisting of metallic zirconate salts, zirconium silicates, and metal fluorozirconates.

6. The composition of claim 5 wherein the zirconium compound is a metallic zirconate salt.

7. The composition of claim 5 wherein the zirconium compound is a metal fluorozirconate.

8. The composition of claim 5 wherein the zirconium compound is a zirconium silicate.

9. As a composition of matter a heat convertible mixture comprising (a) 100 parts by weight of an organopolysiloxane having the general formula $$R_nSiO_{\frac{4-n}{2}}$$

wherein R is a monovalent hydrocarbon radical selected from the group consisting of methyl and phenyl at least 50 per cent of the total number of said radicals being methyl and n has an average value of 1.95 to 2.05 (b) a silica filler having a pore volume of at least 3 ccs. per gram and a heat of wetting in hexamethyldisiloxane of from 0.1 to 1.8 calories per cc. of pore volume, (c) an organic peroxide vulcanizing agent and (d) at least 0.5 part by weight of a zirconium compound selected from the group consisting of metallic zirconate salts, zirconium silicates and metallic fluorozirconate salts.

10. The composition of claim 9 wherein (d) is a metallic zirconate.

11. The composition of claim 9 wherein (d) is a zirconium silicate.

12. The composition of claim 9 wherein (d) is a metallic fluorozirconate salt.

13. The composition of claim 9 wherein (d) consists of 20 to 80 parts of a silica having a pore volume of at least 3 ccs. per gram and a heat of wetting of from 0.1 to 1.8 calories per cc. of pore volume.

REMO R. MANERI.

No references cited.